(12) United States Patent
Srinivasaraghavan et al.

(10) Patent No.: US 8,910,113 B2
(45) Date of Patent: Dec. 9, 2014

(54) METHODS AND SYSTEMS FOR VISUAL CODE REFACTORING

(75) Inventors: Ramesh Srinivasaraghavan, Bangalore (IN); Sameer Bhatt, Uttar Pradesh (IN); Mayank Kumar, Bangalore (IN); Gaurav Priyadarshi, Jharkland (IN); Sunil Bannur, Bangalore (IN); Sreenivas Ramaswamy, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 1111 days.

(21) Appl. No.: 12/564,517

(22) Filed: Sep. 22, 2009

(65) Prior Publication Data

US 2014/0289700 A1     Sep. 25, 2014

(51) Int. Cl.
*G06F 9/44*     (2006.01)
(52) U.S. Cl.
USPC ........... 717/106; 717/107; 717/109; 717/110; 717/113
(58) Field of Classification Search
None
See application file for complete search history.

(56) References Cited

U.S. PATENT DOCUMENTS

2006/0248467 A1* 11/2006 Elvanoglu et al. ............ 715/744

OTHER PUBLICATIONS

Fowler, Martin, "Refactorings in Alphabetical Order," available at http://refactoring.com/catalog.index.html, date unknown (last accessed Aug. 25, 2009).
Fowler, Martin, "Extract Class," available at http://refactoring.com/catalog/extractClass.html, date unknown (last accessed Aug. 26, 2009).
Fowler, Martin, "Move method," available at http://refactoring.com/catalog/moveMethod.html, date unknown (last accessed Aug. 26, 2009).
Egger, Markus, "Anything to Declare?," Code Magazine, available at http://www.code-magazine.com/Article.aspx?quickid=050053, date unknown (last accessed Aug. 26, 2009).
Jetbrains, IntelliJ Idea 7.0, date unknown, available at http://www.jetbrains.com/idea/features/refactoring.html (last Accessed Aug. 26, 2009).

* cited by examiner

*Primary Examiner* — Qamrun Nahar
(74) *Attorney, Agent, or Firm* — Kilpatrick Townsend & Stockton LLP

(57) ABSTRACT

Embodiments include a method comprising providing a design interface that depicts a plurality of interface elements of an application under development, each element defined in source code accessible by the application development environment in a declarative markup language. The method can comprise receiving, through the design interface, data representing a selection of a plurality of the interface elements, identifying the declarative expressions corresponding to the selected interface elements, defining a new declarative expression, and generating at least one code segment using the identified declarative expressions. The method an comprise storing the generated code segment in a computer readable medium, with the stored code segment associated with the new declarative expression, so that the new declarative expression can be inserted into the source code in place of the identified declarative expressions and/or can used in a second application under development.

22 Claims, 5 Drawing Sheets

| File | Edit | Options | Help | | |
|---|---|---|---|---|---|
| Design | Source | | | | |

308

| Customer | Name | Address | City |
|---|---|---|---|
| ABC Co. | Ana | 1100 Peachtree St | Atlanta |
| DEF. Inc. | Bob | 1 Kasturba Rd. | Bangalore |
| GH LLC | Cathy | 410 Park Ave | San Jose |
| I Ltd. | Don | 100 Madison Ave | New York |

310

| Customer | I Ltd |
|---|---|
| Contact Name | Don |
| Address | 100 Madison Ave |
| City | New York |

312

[Back] [Next] [Submit] [Clear]
 314   316    318      320

METHODS AND SYSTEMS FOR VISUAL CODE REFACTORING

TECHNICAL FIELD

The disclosure below generally relates to software development, including design of user interface elements.

BACKGROUND

Code refactoring can be performed by a developer to reorganize the structure of code without breaking the behavior. For instance, code refactoring may be supported by an application development environment such as an integrated development environment (IDE) for use in projects involving procedural logic or other imperative coding paradigms.

User interface (UI) design for an application under development is increasingly visually-oriented. For instance, an application development environment can feature a design view that depicts visual elements representing a runtime appearance of elements of the UI. The visual elements may or may not exactly appear as they will at runtime, but allow a developer to assemble and arrange UI elements such as controls, containers, navigators, skins, effects, and the like. At the same time, the application development environment can maintain corresponding source code defining the visual elements so that when the source code is compiled or interpreted the resulting application provides the UI as arranged in the design view. Often, the source code is generated by the application development environment using a declarative language, such as XML, MXML, HTML, or FXG/MXML.

SUMMARY

Code refactoring can become repetitive and error-prone, and these potential drawbacks may be amplified for a developer used to working primarily in a design view. Embodiments of the present subject matter can provide for refactoring of code at least partially written in a declarative language, with refactoring invoked from a design point-of-view, rather than from a code view. This may, for example, provide at least some of the benefits of code refactoring, such as better-organized code and efficient re-use of code, while reducing potential drawbacks such as delays due to handling (or mishandling) textual code.

Embodiments include a method comprising providing a design interface by a computing system programmed to provide an application development environment. The design interface can depict a runtime appearance of a plurality of interface elements of an application under development. Each of the interface elements can be defined in source code accessible by the application development environment, with the expressions defining the interface elements made in a declarative markup language. The method can comprise receiving, through the design interface, data representing a selection of a plurality of the interface elements. For example, a user may click and select the interface elements and then provide a "refactor" command.

The method can comprise identifying the declarative expressions corresponding to the selected interface elements in one or more code segments of the source code, defining a new declarative expression, and generating at least one code segment using the identified declarative expressions. The method can comprise storing the generated code segment in a computer readable medium with the stored code segment associated with the new declarative expression. The new declarative expression can be inserted into the source code in place of the identified declarative expressions and/or can be used in a second application under development.

The method may additionally comprise identifying other relevant code corresponding to the selected interface elements, such as event handlers, variables, and the like. During refactoring, the other relevant code can be used as a basis for generating the code segment as well.

Embodiments also include systems and computer-readable media implementing one or more aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIG. 3 is a diagram illustrating an example of a graphical user interface of a development application.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
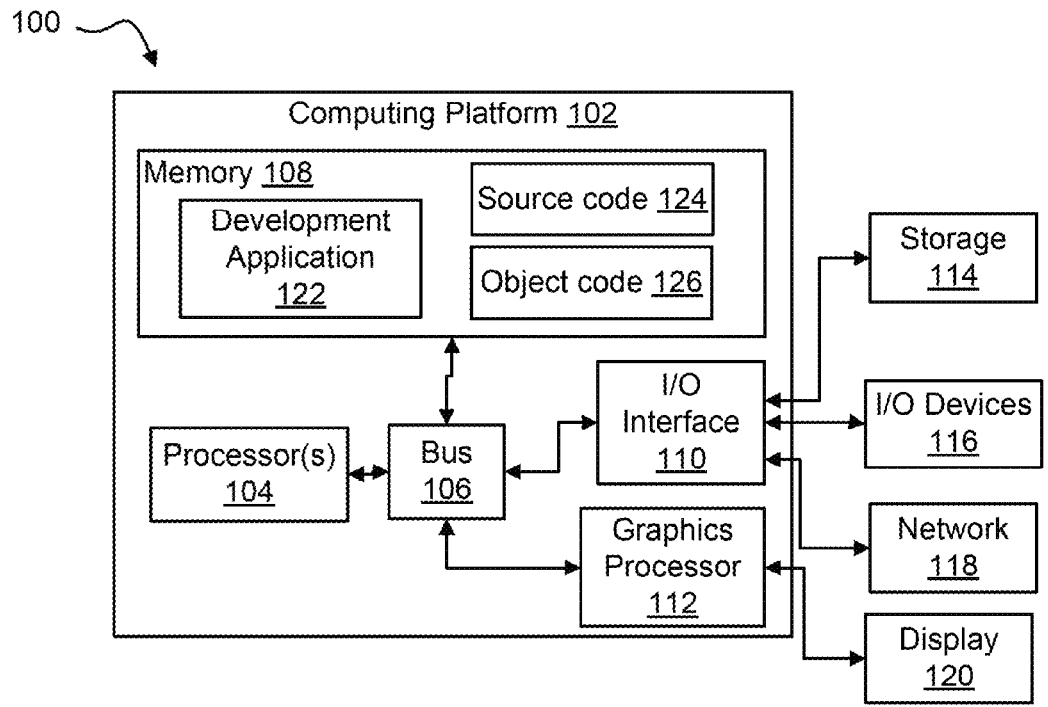
FIG. 1 is a diagram illustrating an exemplary computing system programmed to provide an embodiment of the present subject matter.

FIG. 1 is a block diagram illustrating an exemplary computing system 100 configured to provide a development environment that supports visual code refactoring. In this example, computing system 100 comprises a platform 102 having a processor 104 with access via bus 106 to a tangible computer-readable medium 108 which can comprise RAM, ROM, or Flash memory or any other suitable storage medium. Additional components include input-output (I/O) handling components 110, a display 120, user input (UI) devices 116 (e.g., a mouse, keyboard, touch screen interface, etc.), one or more networking or other interfaces 118 (e.g., Ethernet, USB, etc.), and storage 114 (e.g., hard disk, optical drive(s)).

The program components in memory 108 include a development application 122 which comprises one or more applications, processes, or components that include program code for providing a design view depicting interface elements of an application under development. Development application 122 can access source code 124 and provide object code 126 by compiling or interpreting source code 124. Object code 126 may comprise executable code for use as a standalone application and/or for use with a runtime environment such as Adobe® Air®, available from Adobe Systems Incorporated of San Jose, Calif. As another example, object code 126 may comprise code for providing a rich internet application using the Adobe® Flash® player or another suitable component.

As will be discussed below, development application 122 can include program code for accessing data representing a selection of a plurality of the interface elements of an application under development and program code for refactoring code defining the selected interface elements in response to the selection. Although particular refactoring techniques are noted below, it should be understood that any suitable code refactoring technique can be used.

Figure 2:
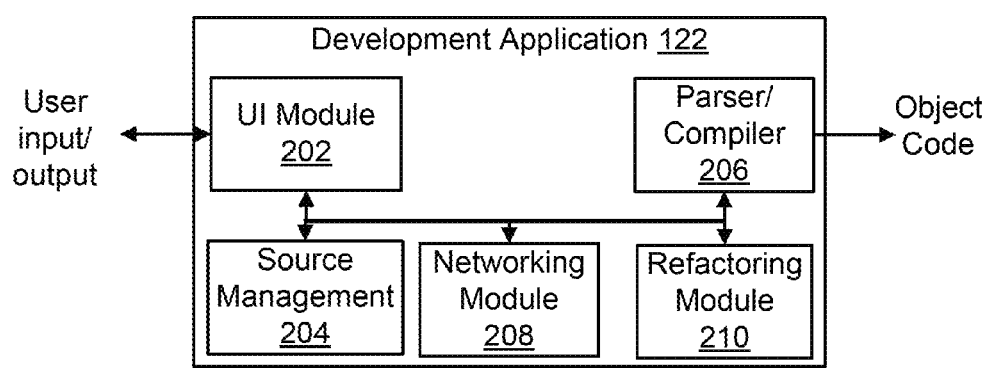
FIG. 2 is a diagram illustrating an exemplary software architecture for a development application that supports visual code refactoring.

FIG. 2 is a diagram illustrating an exemplary software architecture 200 for an example of an embodiment of development application 122 that supports visual code refactoring. In this example, development application 122 includes a user interface (UI) module, a source management module 204, parser/compiler 206, a networking module 208, and a refactoring module 210, which each represent a program component, application, or process that configures the computing system to provide aspects of the development application.

In some embodiments, a development application comprises an integrated development environment (IDE), such as an IDE built using the Eclipse™ Framework, available from the Eclipse Foundation at http://www.eclipse.org and suitably modified to include visual refactoring support in accordance with the present subject matter. However, other development application architectures can be used and additional features may be included beyond those shown in this example.

UI module 202 can configure the computing system to provide a graphical user interface for the application development environment, the graphical user interface depicting a runtime appearance of a plurality of interface elements of an application under development. Generally, the depiction in the graphical user interface can include visual elements (e.g., boxes, text, fields, etc.) showing the layout of the interface elements. For example, IDEs can support a "design surface" or "design view" with a toolbar or palette from which a user can drag and drop interface components. The actual runtime appearance of the elements may or may not match the exact appearance of the elements as depicted in the graphical user interface—for instance, there may be slight variations in size or empty fields where live data will appear at runtime, etc.

Source management module 204 can configure the computing system to access source code of the application under development, the source code comprising declarative expressions that define the interface elements and expressed in a declarative markup language. For example, each user interface element depicted in the design view can have corresponding code in the source code for the application under development. As elements are defined in the design view, source management module 204 can add suitable code for generating the elements to the source.

Additionally, a user may trigger selection interfaces (e.g., dialog boxes, wizards) to adjust properties of interface elements and/or the application, such as adjusting element appearances, behaviors, and use of data providers. These changes made in the design view can be mirrored in the source by way of source management module 204. Additionally, a user may enter code in a source view directly and source management module 204 can coordinate with UI module 202 to update the design view accordingly.

Parser/compiler 206 represents one or more components that can recognize expressions provided using a known syntax and then generate suitable program components for providing functionality associated with the known syntax. As an example, expressions may be mapped to particular sequences of machine instructions that implement the functionality and the sequences of machine instructions can be put together in a way that yields a functional component. For declarative programming language, the parser/compiler 206 may recognize expressions declaring elements (e.g., interface elements, behaviors) in terms of a desired result rather than a series of explicit directions as may be found in imperative programming languages. Of course, an IDE could support multiple different programming languages, including both imperative and declarative languages.

Networking module 208 may be used to access remote data sources, such as sources that provide source code, test data, and/or receive source code or object code, for example. Other network-based functionality may also rely on networking module 208, which can handle the details of contacting remote sources, maintaining connections, etc.

In accordance with the present subject matter, development application 122 includes a refactoring module 210 that configures the computing system using development application 122 to provide visual code refactoring. In some embodiments, this comprises identifying, in response to selection of a plurality of interface elements in the graphical user interface, one or more declarative expressions and other relevant code corresponding to the selected interface elements.

Refactoring can further comprise defining a new declarative expression, generating at least one code segment using the identified declarative expressions and other relevant code, and storing the generated code segment in a computer readable medium, the stored code segment associated with the new declarative expression. The new declarative expression can then be used in any number of ways.

Figure 4:
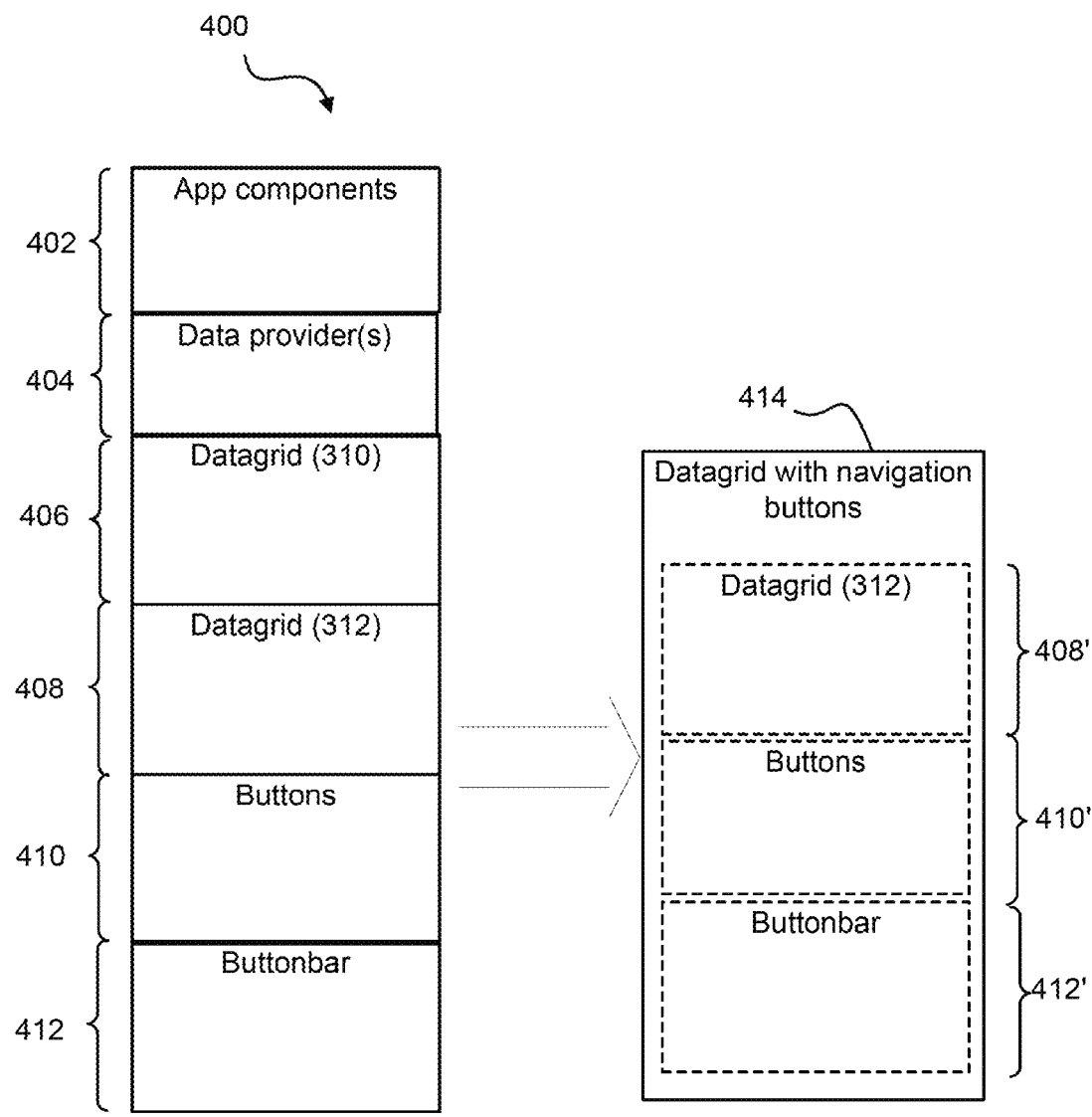
FIG. 4 is a diagram depicting source code segments for components of an application under development and a new component associated with code segments generated based on selected code segments of the application under development.

An example of refactoring that may be carried out using refactoring module 210 will be discussed in conjunction with FIGS. 3 and 4. FIG. 3 is a diagram illustrating an example of a graphical user interface 300 of a development application, while FIG. 4 is a diagram conceptually illustrating source code 400 comprising segments for components of the application under development as shown in FIG. 3.

Turning to FIG. 3, interface 300 includes a menu bar 302 and work area 304. A navigation panel 306 may allow a user to select various folders, files, or other portions of a project. Additional panels, such as project management panels, property inspectors, and other IDE interface elements are not illustrated for ease of explanation, but may be included as well.

In this example, a design view is shown at 308; a corresponding source view that illustrates the text of the source code may be selected via the source tab. In this example, the design view illustrates several interface elements of the application under development. Particularly, a first interface element (data grid 310) includes a plurality of columns, with each column including particular customer data fields (Customer, Name, Address, City) for different customers, which appear in different rows. The application under development may populate these fields using a data provider code segment that provides a call to a web service or another resource. In this example, "live" values are shown in the fields, although in some embodiments a design view may have variable names or indicators of data bindings in the fields rather than live values.

For purposes of this example, assume that a developer is preparing a data entry application. Accordingly, the developer includes a second interface element (data grid 312) with fields for a single customer. For example, the fields in the right column may comprise text fields fillable by a user. A plurality of buttons 314, 216, 318, and 320 may be intended to allow an end user to switch between records ("back" and "next"), update the data ("submit"), or clear all fields ("clear"). Additionally, the buttons are positioned with a graphic element 322.

FIG. 4 illustrates hypothetical code 400 for the interface elements. For example, app components code 402 may comprise source code that sets up the application, such as by instantiating objects corresponding to the other application components and otherwise orchestrating the overall program flow. Data provider code 404 may represent classes and other code for providing calls to data providers and setting up objects to hold data sent to or received from data providers.

Code segments 406, 408, 410, and 412 can correspond to the interface elements shown in design view 308 of FIG. 3. For example, code segment 406 may comprise declarative code defining datagrid 310 in terms of size, position, color, and the like. Additionally, code segment 406 may include code to generate an event and bind the fields of datagrid 310 to an object set up by code segment 402 and holding data received from a data provider.

Code segment 408 may define datagrid 312. Depending on implementation, code segment 408 may bind fields of datagrid 312 to data from a data provider. However, a developer may wish to avoid repeated calls to the data provider and may instead bind the fields of datagrid 312 to a particular row of datagrid 310, with the row selected based on events generated by buttons 314 and 316. Code segments for these behaviors and for defining the appearance of datagrid 312 can be included in code segment 408.

Code segment 410 may represent one or more segments defining buttons 314-320 and generating appropriate button behavior. As was noted above, buttons may be used to generate events, such as switching the data populating datagrid 312. The submit button may generate a suitable event to provide the data in datagrid 312 to the data provider (e.g., a "POST" command to a web service). Button bar code 412 may be used to specify the appearance of graphic element 322.

A developer may spend considerable time arranging graphic elements and setting up relationships between the elements that may be useful in later projects. Although the developer may be able to manually refactor the code by cutting-and-pasting from the source view, this may be inefficient. For instance, the developer may be unfamiliar with all of the source code elements that generate the behavior for a group of interface elements and/or may not have the time to correct errors introduced by copying-and-pasting.

Instead, using an embodiment of the present subject matter, the developer may click on or otherwise select a group of objects in the design view and provide a "refactor" command. In response, refactoring module 210 can utilize source management module 204 data to determine which source code segments correspond to the selected objects—i.e. the code for the objects of the group. Development application 122 maintains data correlating the visual elements as depicted in the design view with the source code for those elements. Accordingly, refactoring module 210 can use this data to determine which code segments to use in refactoring. This may allow the developer to refactor code without ever accessing the source code.

For example, the developer may click on datagrid 312, buttons 314-320, and graphic element 322 or provide another selection action (e.g., dragging a selection box around the elements), right-click, and select "refactor" from a contextual menu. Refactoring module 210 can identify that segments 408, 410, and 412 correspond to the selected group of elements. This code can be copied into local memory and then used to generate code segment 414 comprising refactored code segments 408', 410', and 412' along with data associating a new declarative expression (e.g., "Datagrid with navigation buttons").

Code segments 408', 410', and 412' may comprise copies of code segments 408, 410, and 412. However, in some embodiments, adjustments are made during refactoring as will be noted below. Additionally, generated code segment 414 can comprise additional expressions, such as expressions to setup or reference data providers bound to the elements defined by code segment 412.

For example, references to data providers defined in code segment 404 may be recognized by refactoring module 210 in order to use elements of code segment 404 in generating code segment 414.

Refactoring module 210 may coordinate with source management module 204 to remove the identified code segments from the source code and insert the new declarative expression in place of the identified code segments, if desired. For example, after code segment 414 is generated and stored at a suitable location, code segments 408, 410, and 412 can be removed and replaced with a reference to the "Datagrid with navigation buttons" element (i.e. code segment 414).

Additionally or alternatively, refactoring module 210 may coordinate with UT module 202 and/or other components to make the new declarative expression available for insertion into a second application under development. For example, the "Datagrid with navigation buttons" expression can be added to a list of available components, with a suitable icon or other indicator added to toolbars to allow drag-and-drop addition of the group of objects in a design view for the second application. When the expression/icon is added to the design view, the generated code can be added in the source for the second application in the same manner as predefined components.

In some embodiments, user interface module 202 configures the computing system to provide an interface to receive user input specifying a property of the selected visual element to identify and refactoring module 210 configures the computing system to identify declarative expressions by parsing the source code for the application under development to locate declarative expressions that generate the specified property.

For example, a dialog box can be generated by UI module to receive entry of one or more properties such as the selected visual element's visual appearance, a behavior of the selected visual element, or a data provider used by the selected element. Based on the properties, refactoring module 210 can locate declarative expressions for use in generating code, such as by locating expressions associated with the selected element and whose syntax matches a known syntax for providing the property. As an example, if the declarative language comprises an XML-based language such as MXML, particular tags and/or parameter names can be cross-referenced to the identified property.

As mentioned above, the declarative expression for a selected interface element may reference a data provider for the selected interface element. In some embodiments, the user interface allows a user to provide input specifying whether the data provider should be included in the generated code segment. This may allow for control over how far the refactoring module reaches in generating code.

For instance, in the example of FIG. 3, one possible data provider for datagrid 312 is datagrid 310. If a developer wishes to replace the group of elements 312-322 with a single element, then the data bindings will be retained. However, if the developer wishes to generate a component for later use, then the developer may elect not to preserve the specific data binding for grid 312. Instead, the developer may provide that the relative data bindings for the buttons are to be retained. In that case, refactoring module 210 can insert a dummy variable or placeholder so that, when the newly-created element is used, the appropriate data binding can be set up.

In other cases, a developer may wish to retain all data bindings. For example, if datagrid 310 is to be included in a refactoring operation, the generated code may include the elements that provide the datagrid along with code to request data from the web service or other specified data provider. For instance, while developing a first application a developer may set up a "weather widget" that requests weather data from a web service and uses data bindings to populate city and temperature fields of UI elements. The "weather widget" can be refactored into a component for use in later applications so that, when the widget is selected during development of a second application, code for generating the UI elements and code for contacting the weather service and binding the results is added to the second application.

As another example of a property, the developer may specify that style elements and/or effects associated with the selected elements are to be included in the refactored code. For example, the source code may include a script or other run of code that generates a behavior, such as an animation or change of color when a button is clicked or hovered over. When code is being generated, code for causing the effect can be copied along with the expressions that define the selected elements.

Figure 5:
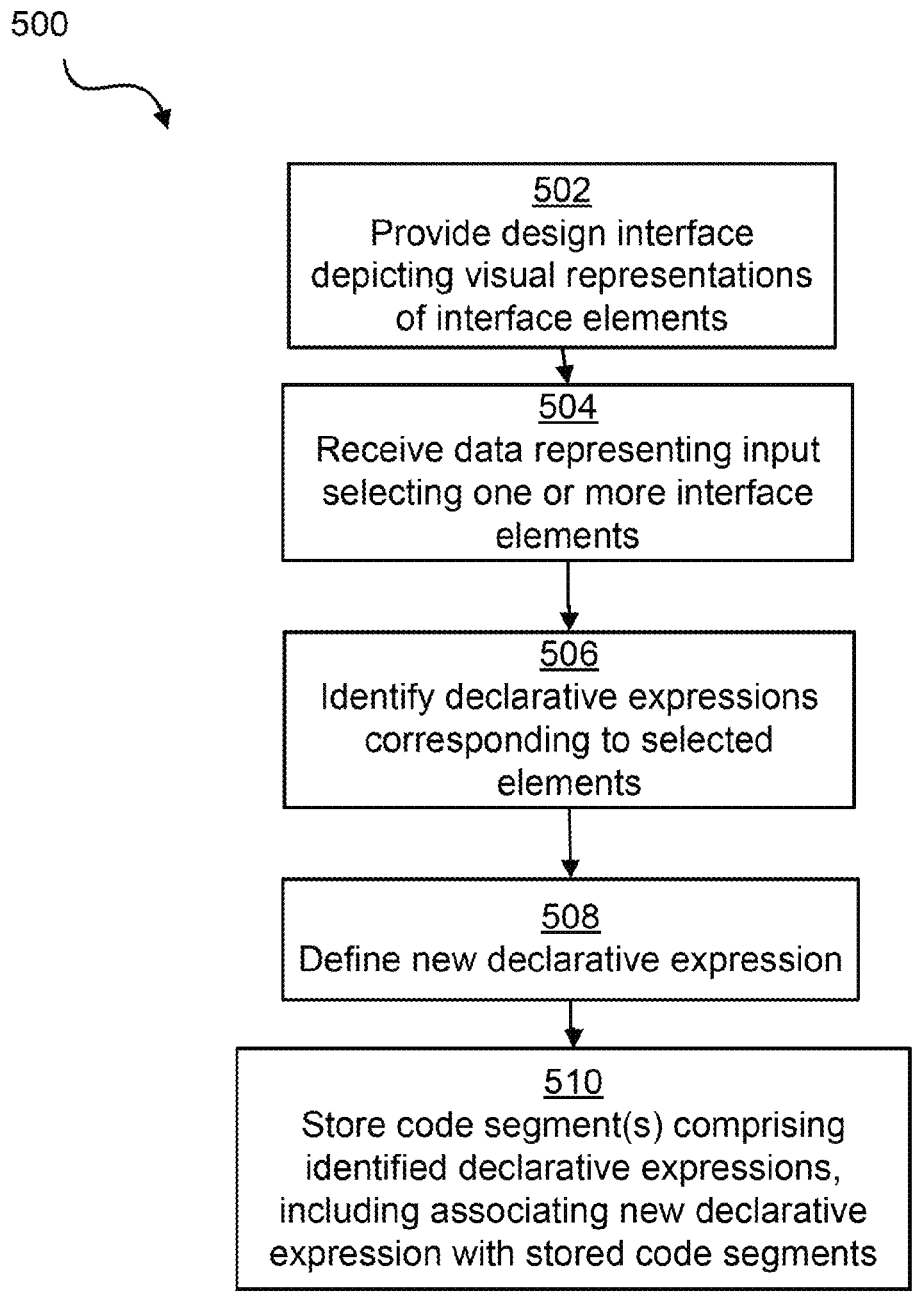
FIG. 5 is a flowchart showing steps in an exemplary method of visually refactoring code.

FIG. 5 is a flowchart showing steps in an exemplary method 500 of visually refactoring code. Block 502 represents providing a design interface by a computing system programmed to provide an application development environment, the design interface depicting a runtime appearance of a plurality of interface elements of an application under development. For example, a design view as mentioned above can be rendered on screen with appropriate representations of the UI elements based on the source code.

Block 502 represents receiving, through the design interface, data representing a selection of a plurality of the interface elements. For example, the desired elements may be clicked, selected via another gesture (e.g., drag-and-drop, a selection box, etc.). Block 504 represents identifying the declarative expressions corresponding to the selected interface elements in one or more code segments of the source code for the application under development. In addition to the declarative expressions, other relevant code can be identified as well.

For instance, working data for the development application may cross-reference representations in the design interface to corresponding source code by file, line number, and/or other designators. As another example, the source code can be searched to match titles/identifiers for the selected visual representations and titles/identifiers for source code elements.

Other relevant code can include, but is not limited to, lines of code making reference to variables/data providers, code defining and/or invoking event handlers, and code defining methods invoked by or applied to the selected element(s). More generally, the other relevant code can include code segments that operate on the selected interface elements and/or are triggered by interaction with the selected interface elements. Other relevant code can be identified based on syntax in some embodiments. For example, if a selected interface element includes a call to an event generator, data provider, or other behavioral code, then the code representing the call to the behavioral code and the behavioral code itself can be identified in the source code.

Block 506 represents defining a new declarative expression. As an example, a developer may be prompted to enter a name for the refactored code element and/or a default name may be generated.

Block 508 represents generating at least one code segment using the identified declarative expressions and other relevant code, while block 510 represents storing the generated code segment in a computer readable medium, the stored code segment associated with the new declarative expression. For example, the refactored code may be generated by copying and pasting some or all of the lines of code identified as corresponding the selected interface elements within a container.

Suitable code can be added during the generation process as well. For instance, if code for several elements is to be combined into a container, then appropriate tags or headers can be included so that the generated code can be treated as a unitary component with a name so that the unitary component will be invoked using the new declarative expression. As another example, placeholder values can be inserted rather than actual variables if a user elects not to preserve some or all data bindings.

Figure 6:
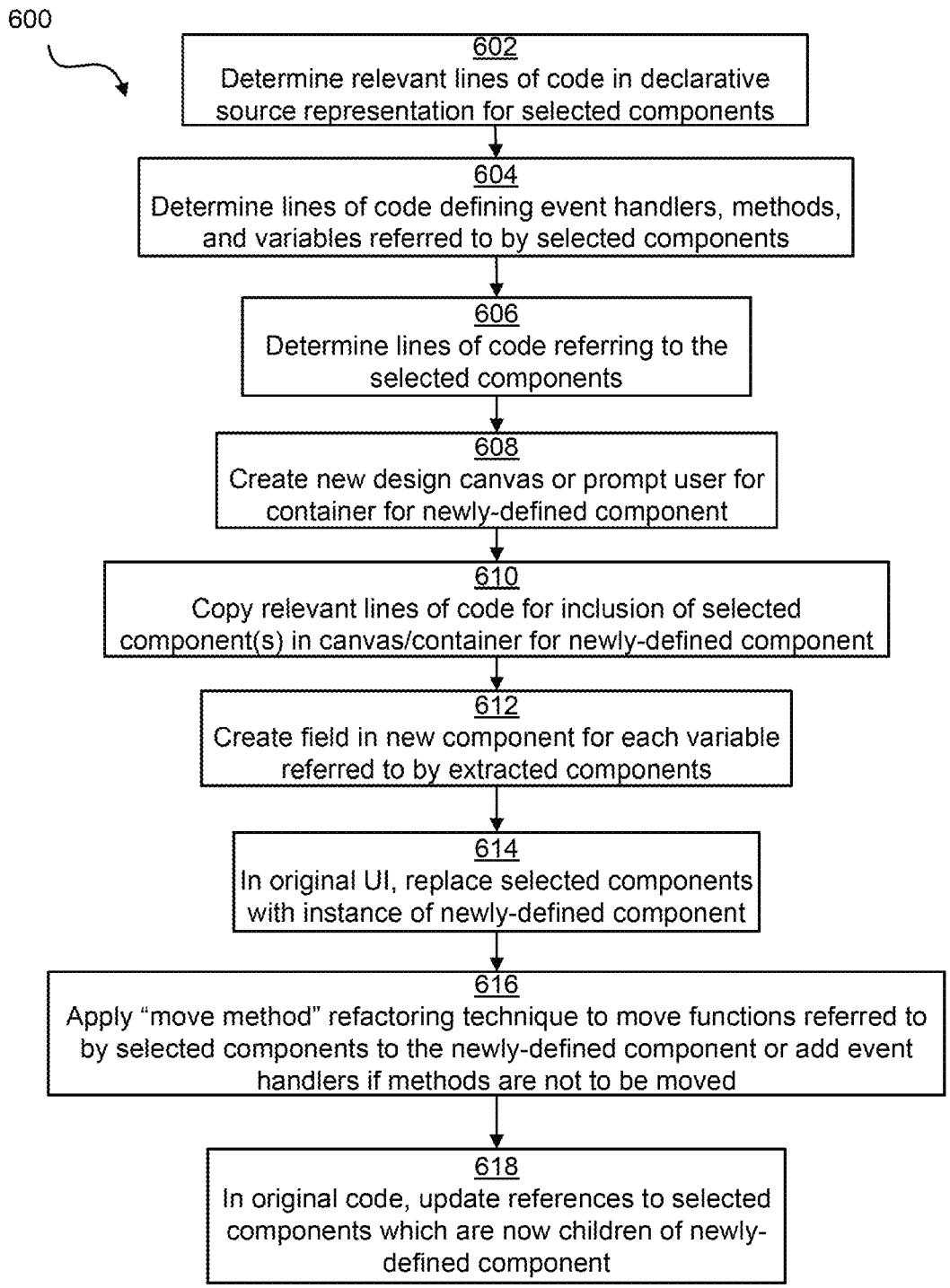
FIG. 6 is a flowchart showing steps in an exemplary method of generating code segments based on selected code segments of an application under development.

FIG. 6 is a flowchart showing steps in an exemplary method 600 of generating code segments based on selected code segments of an application under development. Block 602 represents determining relevant lines of code in a declarative source representation of the selected components. As was noted above, this may be achieved by referencing data maintained by a development application, the data cross-referencing design view and source view depictions of components, to identify declarative expressions for the selected components along with other relevant code.

Block 604 represents determining lines of code defining event handlers, methods, variables, and/or other behavioral components referred to by the selected components. This can be achieved, for example, by parsing the code for the selected components and identifying calls to functional code based on syntax—for example, in MXML, a call to a data provider may use the syntax "dataprovider={getinfo.lastresult}". The functional code for "getinfo" can be identified by searching for appropriate syntax defining the "getinfo" call, such as a statement assigning results from a query to "getinfo." As another example, the code for the selected components can be searched for references to variables defined elsewhere in the application for later use if the variables are to be treated as parameters in a newly-defined component including the selected components.

Block 606 represents determining lines of code referring to the selected components. This can be carried out, for example, by searching for variables or other references to object, fields, or other identifiers included in a selected component. As an example, if the selected component comprises a datagrid with one or more fields, the field names can be searched to determine if any other elements refer to the fields of the datagrid.

Block 608 represents creating a new design canvas, a new container, and/or prompting a user for a container for a newly-defined component. As was mentioned above, refactoring may be performed to define a new component for a second application or for use in an existing application. In some embodiments, when the refactored code is to be used in an existing application, the user is prompted to select a container (e.g., a location within the existing application) in which the refactored code component will be placed.

Block 610 represents copying relevant lines of code for including the selected components in the new design canvas or selected container. Block 612 represents creating a field in the new component corresponding to each variable (if any) referred to by the selected components. As was mentioned above, data bindings may be preserved when code is refactored, and in order to do so, the newly-created component can include fields for output of the bound data. Additionally, variables referred to by the original components may be converted into parameters to be passed to the newly-defined component, with appropriate code for obtaining the parameters included in the new component.

Block 614 represents replacing the selected components with an instance of the newly-defined component. This can allow a developer to see a visual representation of the refactored code to verify that the refactoring process has yielded an acceptable result. Additionally, references to the selected components can be replaced with a reference to the newly-defined component. For example, code setting up the selected components can be deleted and a reference referring to a container for the new component can be inserted into the source code.

Block 616 represents applying the "move method" refactoring technique to move functions referred to by the selected components to the newly-defined component. As was noted earlier, when refactoring code, a developer may desire to retain behaviors and data providers referenced by the original components. The "move method" technique can include inserting code defining and invoking methods originally defined/invoked by the selected components, with the technique including a series of steps to ensure that the correct target object is referenced when the method code is included in the new component. This may be achieved by parsing the arguments of the method as originally defined and verifying that the arguments of the method as included in the new component refer to the correct target object(s).

In some instances, the "move method" technique may not be used. As an example, an interface may be presented prior to or during refactoring to determine which behavioral aspects of a selected component (or components) should be left in place and/or which aspects should be included in the refactoring process. A developer may desire for certain behavioral code, such a method invoking a data provider and setting up an object to hold data returned from the data provider, to remain separate from the refactored components. Instead of moving all of the behavioral code to the newly-defined component, appropriate event handlers can be included in the newly-defined component to invoke the method.

Block 618 represents updating portions of the original code. For instance, as was noted above, other components of the application under development may reference the selected components or portions thereof, such as individual data fields. These references, which were identified at block 606, can be updated to refer to the newly-defined component. Particularly, the selected components may be defined as children within the container for the newly-defined component and the references can be updated to appropriately invoke the parent-child relationship when referring to fields or other elements of the selected components. Additionally, appropriate code can be included to pass parameters to the newly-defined component. For instance, based on the parameters set up in the newly-defined component, appropriate data binding statements can be added to the original code to ensure the newly-defined component receives the parameter.

Refactoring may help ease workflows and increase productivity for application developers. For example, application development may depend on work by design-oriented personnel and code-oriented personnel. The design-oriented personnel may be accustomed to working in a graphic-based environment, such as Adobe® Flash® Catalyst® and create a Flex® application therein. The created application may be exported by the design-oriented personnel and then imported by the code-oriented personnel using a tool such as Adobe® Flash® Builder™ to add behavioral logic (e.g., connecting interface elements to appropriate calls to servers, etc.). The design-oriented personnel may wish to make additional changes to the application, such as by combining interface elements into a single element for later reuse. In order for proper "round trip" editing to occur without breaking functionality of the application, visual refactoring techniques in accordance with the present subject matter can be used.

Below, a particular example of refactoring is discussed with reference to sample MXML code. The use of MXML in this example is for purposes of illustration only—the present subject matter can be used with code in any format.

Generally speaking, the application defines three interface elements, a first data grid "dataGrid" listing a plurality of books by title, price, and ISBN. The first data grid is populated by results from a query to a service called "testservice." A second data grid "dataGrid2" lists biographical information for an author and is populated with results from a query to "testservice" based on the ISBN of the book currently selected in the first datagrid. Other interface elements include a form for updating the title, price, and ISBN of a selected book, with the update process controlled by buttons.

In this refactoring example, a user can view a design view showing the datagrids, form, and buttons and select the first datagrid, the form, and the buttons. Then, the user can provide a "refactor" command which triggers a refactoring process to use the "Example Code of Original Application" to generate refactored code noted below at "Example Refactored Code for Base Application" and "Example Refactored Code for MyGridForm."

For purposes of context, the original code is presented below:

| Example Code of Original Application | Discussion |
|---|---|
| <?xml version="1.0" encoding="utf-8"?><br><mx:Application xmlns:mx="http://www.adobe.com/2006/mxml"<br>layout="absolute" | Initial application setup code. |

-continued

| Example Code of Original Application | Discussion |
|---|---|
| `minWidth="1024" minHeight="768"`<br>`xmlns:testservice="services.testservice.*"`<br>`xmlns:valueObjects="valueObjects.*"`<br>`xmlns:ns1="*"`<br>`creationComplete="application1_creationCompleteHandler(event)">`<br>`<mx:Script>`<br>`<![CDATA[`<br>`import mx.events.ListEvent;`<br>`import mx.events.FlexEvent;`<br>`import mx.controls.Alert;`<br>`[Bindable]`<br>`private var adminUser:Boolean = false;` | This portion of code sets up event handlers. |
| `protected function dataGrid_creationCompleteHandler(event:FlexEvent):void`<br>`{`<br>`    getAllBooksResult.token = testService.getAllBooks( );`<br>`}` | This portion defines a method "getAllBooks" used to populate a first data grid defined below |
| `protected function dataGrid2_changeHandler(event:ListEvent):void`<br>`{`<br>`    getBookAuthorsResult.token = testService.getBookAuthors(dataGrid.selectedItem.ISBN);`<br>`}` | This portion defines a method "getBookAuthors" used to populate a second data grid based on the selected item in the first data grid |
| `protected function application1_creationCompleteHandler(event:FlexEvent):void`<br>`{`<br>`    //this would be determined by the login information`<br>`    adminUser = true ;`<br>`}`<br>`]]>`<br>`</mx:Script>` | This portion defines a variable used to enable/disable a button; in practice, the adminUser variable could be set by a function |
| `<mx:Binding source="dataGrid.selectedItem as Book" destination="book"/>`<br>`<testservice:TestService id="testService" fault="Alert.show(event.fault.faultString + '\n' + event.fault.faultDetail)" showBusyCursor="true"/>`<br>`<mx:CallResponder id="getAllBooksResult"/>`<br>`<valueObjects:Book id="book" Title="{titleTextInput.text}" Price="{priceTextInput.text}" ISBN="{iSBNTextInput.text}"/>` | This portion sets up data bindings and defines a "Call Responder" that populates a "Book" object based on a currently-selected item in "dataGrid", which is defined below |
| `<mx:DataGrid id="dataGrid" creationComplete="dataGrid_creationCompleteHandler(event)" dataProvider="{getAllBooksResult.lastResult}" x="34" y="25">`<br>`    <mx:columns>`<br>`        <mx:DataGridColumn headerText="Title" dataField="Title"/>`<br>`        <mx:DataGridColumn headerText="Price" dataField="Price"/>`<br>`        <mx:DataGridColumn headerText="ISBN" dataField="ISBN"/>`<br>`    </mx:columns>`<br>`</mx:DataGrid>` | This portion defines a grid interface element called "dataGrid" with a column for the title, price, and ISBN from the "getAllBooksResult" function. |
| `<mx:Form x="35" y="186">`<br>`    <mx:FormItem label="Title">`<br>`        <mx:TextInput id="titleTextInput" text="{book.Title}"/>`<br>`    </mx:FormItem>`<br>`    <mx:FormItem label="Price">`<br>`        <mx:TextInput id="priceTextInput" text="{book.Price}"/>`<br>`    </mx:FormItem>`<br>`    <mx:FormItem label="ISBN">`<br>`        <mx:TextInput id="iSBNTextInput" text="{book.ISBN}"/>`<br>`    </mx:FormItem>`<br>`</mx:Form>` | This portion defines an interface element comprising a form for inputting a title, price, and/or ISBN of the selected book |
| `<mx:Button x="73" y="309" label="Update"/>`<br>`<mx:Button x="148" y="309" label="Delete" enabled="{adminUser}"/>` | This portion defines buttons to update or clear a particular field. The "Delete" button is enabled based on the |

-continued

| Example Code of Original Application | Discussion |
|---|---|
| <mx:DataGrid x="380" y="25" id="dataGrid2" dataProvider="{getBookAuthorsResult.lastResult}" change="dataGrid2_changeHandler(event)">    <mx:columns>       <mx:DataGridColumn headerText="FirstName" dataField="FirstName"/>       <mx:DataGridColumn headerText="LastName" dataField="LastName"/>       <mx:DataGridColumn headerText="Email" dataField="Email"/>       <mx:DataGridColumn headerText="Phone" dataField="Phone"/>    </mx:columns>   </mx:DataGrid>   <mx:CallResponder id="getBookAuthorsResult"/> | value for the "adminUser" variable This portion defines a second data grid populated by "getBookAuthorsResult" based on the selected item in the first datagrid |

20

Based on the original code, new code can be generated. First, the code for a newly-defined component is noted below:

| Example Refactored Code for "MyGridForm" | Discussion |
|---|---|
| <?xml version="1.0" encoding="utf-8"?> <mx:Canvas xmlns:mx="http://www.adobe.com/2006/mxml" width="330" height="382"    xmlns:testservice="services.testservice.*"    xmlns:valueObjects="valueObjects.*"    > | A separate container has been defined for "myGridForm" and containing the refactored code |
| <mx:Script>   <![CDATA[     import mx.events.FlexEvent;     import mx.controls.Alert;     private var _adminUser:Boolean = false;     [Bindable]     public function get adminUser( ):Boolean     {       return _adminUser;     }     public function set adminUser(value:Boolean):void     {       _adminUser = value;     }     protected function dataGrid_creationCompleteHandler(event:FlexEvent):void     {       getAllBooksResult.token = testService.getAllBooks( );     }   ]]> </mx:Script> | Setup information and event handlers are now defined for myGridForm separately<br><br>These portions set up the "adminUser" variable for use by MyGridForm as a parameter passed from the baseline application. |
| <mx:Binding source="dataGrid.selectedItem as Book" destination="book"/><br><br><testservice:TestService id="testService" fault="Alert.show(event.fault.faultString + '\n' + event.fault.faultDetail)" showBusyCursor="true"/>   <mx:CallResponder id="getAllBooksResult"/>   <valueObjects:Book id="book" Title="{titleTextInput.text}" Price="{priceTextInput.text}" ISBN="{iSBNTextInput.text}"/> | This portion is copied from the original code. As noted above, this code sets up data bindings and defines a "Call Responder" that populates a "Book" object based on a currently-selected book in "dataGrid", which is defined below |
| <mx:DataGrid id="dataGrid" creationComplete="dataGrid_creationCompleteHandler(event)" dataProvider="{getAllBooksResult.lastResult}" x="14" y="10">   <mx:columns>      <mx:DataGridColumn headerText="Title" dataField="Title"/>      <mx:DataGridColumn headerText="Price" dataField="Price"/> | This portion is copied from the original code. As noted above, this code defines a grid interface element called "dataGrid" with a column for the title, price, and ISBN from |

| Example Refactored Code for "MyGridForm" | Discussion |
|---|---|
| ```<br>            <mx:DataGridColumn headerText="ISBN"<br>dataField="ISBN"/><br>        </mx:columns><br>    </mx:DataGrid><br>    <mx:Form x="35" y="186"><br>        <mx:FormItem label="Title"><br>            <mx:TextInput id="titleTextInput"<br>text="{book.Title}"/><br>        </mx:FormItem><br>        <mx:FormItem label="Price"><br>            <mx:TextInput id="priceTextInput"<br>text="{book.Price}"/><br>        </mx:FormItem><br>        <mx:FormItem label="ISBN"><br>            <mx:TextInput id="iSBNTextInput"<br>text="{book.ISBN}"/><br>        </mx:FormItem><br>    </mx:Form><br>    <mx:Button x="61" y="309" label="Update"/><br>    <mx:Button x="148" y="309" label="Delete"<br>enabled="{adminUser}"/><br></mx:Canvas><br>``` | the "getAllBooksRsult" function.<br><br>This portion is also copied from the original code. As noted above, this code defines a Form and buttons for updating an entry for a particular book.<br><br>As mentioned above, the code defining "dataGrid", the form, and the buttons has been refactored into a standalone element referenced in the code for the application. |

As mentioned above, the refactoring process can include updating references in the original code to preserve intended functionality. Examples of these updates are noted below:

| Example Refactored Code for Base Application | Discussion |
|---|---|
| ```<br><?xml version="1.0" encoding="utf-8"?><br><mx:Application xmlns:mx="http://www.adobe.com/2006/mxml"<br>layout="absolute"<br>    minWidth="1024" minHeight="768"<br>    xmlns:testservice="services.testservice.*"<br>        xmlns:ns1="*"<br>    creationComplete="application1_creationCompleteHandler<br>(event)"><br>    <mx:Script><br>        <![CDATA[<br>            import mx.events.ListEvent;<br>            import mx.events.FlexEvent;<br>            import mx.controls.Alert;<br>            [Bindable]<br>            private var adminUser:Boolean = false;<br>            protected function<br>dataGrid2_changeHandler(event:ListEvent):void<br>            {<br>                getBookAuthorsResult.token =<br>testService.getBookAuthors(myGridForm.dataGrid.selectedItem.I<br>SBN);<br>            }<br>            protected function<br>application1_creationCompleteHandler(event:FlexEvent):void<br>            {<br>                //this would be determined by the<br>login information<br>                adminUser = true ;<br>            }<br>        ]]><br>    </mx:Script><br>    <mx:Binding source="adminUser"<br>destination="myGridForm.adminUser" /><br>``` | <br><br><br><br><br><br><br><br><br><br><br><br><br>The application setup code has been adjusted to refer to the component "myGridForm"<br><br><br><br>As noted above, the value for adminUser could be determined by a function.<br><br>Because the selected components now included in "myGridForm" refer to the "adminUser" variable, a data binding has been |

| Example Refactored Code for Base Application | Discussion |
| --- | --- |
| | included to pass the data to "myGridForm" |
| <testservice:TestService id="testService" fault="Alert.show(event.fault.faultString + '\n' + event.fault.faultDetail)" showBusyCursor="true"/> | This code was copied into the refactored code, but is also retained in the application code since other components refer to this code. |
| <testservice:TestService id="testService" fault="Alert.show(event.fault.faultString + '\n' + event.fault.faultDetail)" showBusyCursor="true"/> | The application code now refers to the container for the refactored code. |
| <mx:DataGrid x="380" y="25" id="dataGrid2" dataProvider="{getBookAuthorsResult.lastResult}" change="dataGrid2_changeHandler(event)">    <mx:columns>       <mx:DataGridColumn headerText="FirstName" dataField="FirstName"/>       <mx:DataGridColumn headerText="LastName" dataField="LastName"/>       <mx:DataGridColumn headerText=" Email" dataField="Email"/>       <mx:DataGridColumn headerText=" Phone" dataField="Phone"/>    </mx:columns> </mx:DataGrid> <mx:CallResponder id="getBookAuthorsResult"/> </mx:Application> | In this example, the second datagrid "dataGrid2" is not included in the selected components, and so its code remains in the original application code. As noted above, its data provider "getBookAuthorsResult" is set up to properly refer to "myDatagrid" |

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method, comprising:
providing a design interface by a computing system programmed to provide an application development environment, the design interface depicting a runtime appearance of a plurality of interface elements of an application under development, each of the interface elements defined in source code accessible by the application development environment, the source code including declarative expressions defining the interface elements, the source code expressed in a declarative markup language;
receiving, through the design interface, data representing a selection of a plurality of the interface elements;
identifying the expressions corresponding to the selected interface elements in one or more code segments of the source code for the application under development;
defining a new declarative expression;
generating at least one code segment using the identified expressions; and
storing the generated code segment in a computer readable medium, the stored code segment associated with the new declarative expression.

2. The method set forth in claim 1, wherein at least one identified expression references a data provider for a selected interface element.

3. The method set forth in claim 2, further comprising:
presenting an interface to receive input specifying whether the referenced data provider should be included in the stored code segment,
wherein storing at least one code segment comprises storing the identified expression referencing the data provider if the input specifies that the reference to the data provider should be included.

4. The method set forth in claim 1, further comprising:
removing the identified code segments from the source code for the application under development; and
inserting the new declarative expression in the source code for the application under development in place of the identified code segments.

5. The method set forth in claim 1, further comprising:
inserting the new declarative expression and identified expressions into source code for a second application under development.

6. The method set forth in claim 1, further comprising:
providing an interface for receiving user input specifying a property of the selected visual element to identify,
wherein identifying comprises parsing the source code for the application under development to locate those declarative expressions that generate the specified property.

7. The method set forth in claim 1, wherein identifying comprises parsing the source code for the application under development to locate those expressions that generate a property of the selected visual element, the property comprising at least one of:
the selected visual element's visual appearance;
a behavior of the selected visual element; or
a data provider used by the selected element.

8. A computing system comprising a processor with access to a computer-readable medium tangibly embodying program components, the program components comprising:
a user interface module that configures the computing system to provide a graphical user interface of an application development environment, the graphical user interface depicting a runtime appearance of a plurality of interface elements of an application under development;
a source management module that configures the computing system to access source code of the application under development, the source code comprising expressions that define the interface elements, the source code expressed in a declarative markup language;
a refactoring module that configures the computing system to:
identify, in response to selection of a plurality of interface elements in the graphical user interface, expressions corresponding to the selected interface elements,
define a new declarative expression,
generate at least one code segment using the identified expressions, and store the generated code segment in a computer readable medium, the stored code segment associated with the new declarative expression.

9. The computing system set forth in claim 8, wherein at least one identified expression references a data provider for the selected interface element.

10. The computing system set forth in claim 9, wherein the refactoring module configures the computing system to store the identified expression referencing the data provider based on input data specifying whether the data provider should be included in the generated code segment.

11. The computing system set forth in claim 8, wherein the refactoring module further configures the computing system to remove the identified code statements from the source code and insert the new declarative expression in place of the identified code segments.

12. The computing system set forth in claim 8, wherein the refactoring module further configures the computing system to make the new declarative expression available for insertion into source code for a second application under development.

13. The computing system set forth in claim 8,
wherein the user interface module configures the computing system to provide an interface to receive user input specifying a property of the selected visual element to identify, and
wherein the refactoring module is configures the computing system to identify declarative expressions by parsing the source code for the application under development to locate declarative expressions that generate the specified property.

14. The computing system set forth in claim 13, wherein the specified property comprises at least one of the selected visual element's visual appearance, a behavior of the selected visual element, or a data provider used by the selected element.

15. A computer program product comprising a computer readable medium tangibly embodying program code executable by a computing system, the program code comprising:
program code for providing a design view depicting interface elements of an application under development;
program code for accessing data representing a selection of a plurality of the interface elements of an application under development; and
program code for refactoring code defining the selected interface elements in response to the selection, wherein refactoring comprises
identifying expressions corresponding to the selected interface elements in one or more code segments of source code for the application under development;
defining a new declarative expression;
generating at least one code segment using the identified expressions; and
storing the generated code segment in a computer readable medium, the stored code segment associated with the new declarative expression.

16. The computer program product set forth in claim 15, further comprising:
program code for removing the identified code segments from the source code for the application under development; and
program code for inserting the new declarative expression in the source code for the application under development in place of the identified code segments.

17. The computer program product set forth in claim 15, further comprising:
program code for inserting the new declarative expression and identified declarative expressions into source code for a second application under development.

18. The computer program product set forth in claim 15, wherein identifying comprises parsing the source code for the application under development to locate those expressions that generate a property of the selected visual element, the property comprising at least one of:
the selected visual element's visual appearance;
a behavior of the selected visual element; or
a data provider used by the selected element.

19. The computer program product set forth in claim 15, wherein generating at least one code segment comprises:
determining relevant lines of code in the identified declarative expressions that generate the selected component;
copying the relevant lines of code; and
copying code of a function referred to by the selected component,
wherein the stored code segment comprises the relevant lines of code and code invoking the function.

20. The method set forth in claim 1, further comprising:
receiving, through the design interface, data representing an adjustment of a property value associated with at least one of the plurality of the interface elements;
adjusting the expressions corresponding to the adjusted property value associated with the at least one of the plurality of the interface elements;
defining an adjusted declarative expression;
generating at least another code segment using the adjusted declarative expressions; and
storing the at least another code segment in the computer readable medium, the stored at least another code segment associated with the adjusted declarative expression.

21. The computing system set forth in claim 8, wherein the refactoring module is further configured to:
receive, through the graphical user interface, an indication to adjust a property value associated with at least one of the plurality of interface elements;
adjust the property value associated with the at least one of the plurality of interface elements;
define an adjusted declarative expression,
generate at least another code segment using the adjusted declarative expressions, and
store the at least another code segment in the computer readable medium, the stored at least another code segment associated with the adjusted declarative expression.

22. The computer program product set forth in claim 15, wherein refactoring comprises:
receiving an indication of adjustment of at least one property value associated with the selected interface elements;
identifying expressions corresponding to the adjusted property values associated with the selected interface elements in one or more code segments of source code for the application under development;
defining a new adjusted declarative expression;
generating at least one code segment using the adjusted declarative expressions; and
storing the at least one code segment in a computer readable medium, the stored at least one code segment associated with the adjusted declarative expression.

* * * * *